W. P. VALENTINE.
Pipe-Joints.
No. 146,622.        Patented Jan. 20, 1874.
Fig: 1.
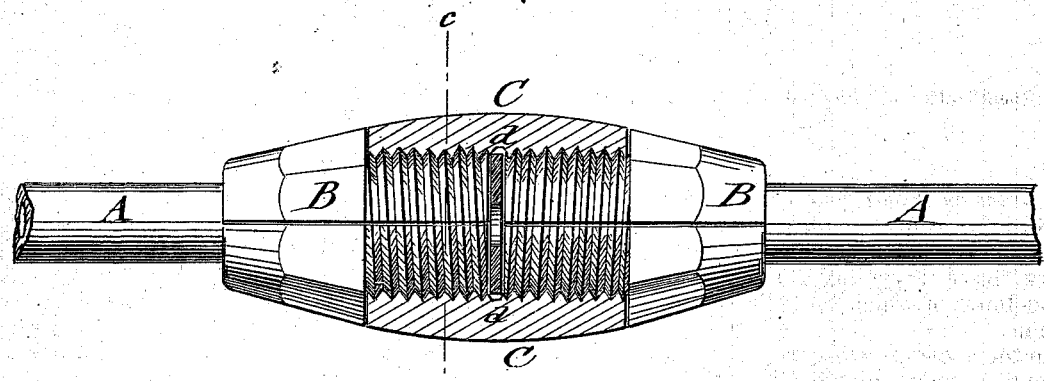
Fig: 2.     Fig: 3.
 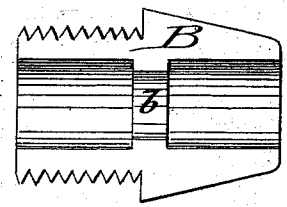
Fig: 4.
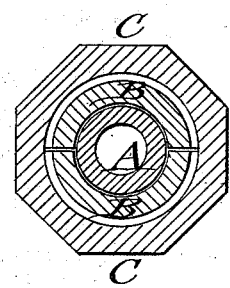
WITNESSES:
Chas. Nido
INVENTOR:
W. P. Valentine
BY
ATTORNEYS.

UNITED STATES PATENT OFFICE.

WILLIAM P. VALENTINE, OF NEW YORK, N. Y.

IMPROVEMENT IN PIPE-JOINTS.

Specification forming part of Letters Patent No. 146,622, dated January 20, 1874; application filed November 1, 1873.

*To all whom it may concern:*

Be it known that I, WILLIAM P. VALENTINE, of the city, county, and State of New York, have invented a new and Improved Pipe-Joint, of which the following is a specification:

In the accompanying drawing, Figure 1 represents a sectional side elevation of my improved pipe-joint. Figs. 2 and 3, respectively, show detail side views of the pipe end and inclosing-shell socket; and Fig. 4 is a vertical transverse section of the joint on the line $c\ c$, Fig. 1.

Similar letters of reference indicate corresponding parts.

The object of my invention is to produce an improved pipe-joint for water, steam, gas, and other pipes by which they may be connected at any suitable point and under any angle without the use of fire or solder by simple mechanical means, so that skilled labor may be dispensed with in making them, and a considerable saving in the cost of pipe-joints be produced. My invention consists of sockets made of two semi-shells, and fitted, by means of a projecting shoulder, to the recessed ends of the adjoining pipes. The sockets are cut with an outer screw-thread, and firmly connected when placed on the pipes by a sleeve with right-and-left-hand thread, which is screwed over it without altering the position of the pipes, while a leather or rubber washer in the sleeve secures the tight communication of the pipes.

A in the drawing represents the pipes to be connected, which may be of lead, iron, or other suitable material. A groove or recess, $a$, is pressed or cut at some distance from the pipe end, into which the central shoulder at $b$ the inside of the pipe-socket B projects, so as to fit closely therein. Socket B is produced of two equal halves cut in the direction of the longitudinal axis, which are exactly fitted to the end of pipe A. A screw-thread is cut on the outer part of each socket B, so that the screw ends of two adjoining pipe-sockets may be firmly clamped by a sleeve, C, of suitable size, with a right-and-left-hand screw-thread at the inside. The pipe and socket ends will meet in sleeve C, forming, together with a washer, $d$, of leather, rubber, or other packing interposed between them, a perfectly tight connection with each other. The turning of sleeve C is accomplished by a wrench without turning the pipes, one being drawn toward the other. A layer of paint or cement may be used between socket and pipe, so as to prevent all possibility of leakage. The tapping of the pipes may be accomplished at the joint, or angular and cross-joints, whether single or double, be produced by arranging the sleeve with screw-holes at the sides, into which the connecting-pipes are screwed. This joint may also be used for the ends of pipes by closing the sleeve at one end and providing it with a stop-cock. It may further be adapted to various purposes, as on account of the simple manner of connecting the pipes they may be easily laid and repaired, economizing time and labor thereby.

Having thus described my invention, I claim as new and desire to secure by Letters Patent—

The sockets B B, each provided with an interior shoulder, $b$, in combination with the pipes A A, having a corresponding groove or recess, $a$, and the connecting-sleeve C, substantially as specified.

WM. P. VALENTINE.

Witnesses:
 T. B. MOSHER,
 ALEX. F. ROBERTS.